US011984661B2

(12) United States Patent
Jiang et al.

(10) Patent No.: US 11,984,661 B2
(45) Date of Patent: May 14, 2024

(54) ELECTRONIC DEVICES HAVING MILLIMETER WAVE AND ULTRA-WIDEBAND ANTENNA MODULES

(71) Applicant: Apple Inc., Cupertino, CA (US)

(72) Inventors: Yi Jiang, Cupertino, CA (US); Jiangfeng Wu, San Jose, CA (US); Siwen Yong, Mountain View, CA (US); Hao Xu, Cupertino, CA (US); Ana Papio Toda, San Jose, CA (US); Carlo di Nallo, Belmont, CA (US); Michael D. Quinones, Los Gatos, CA (US); Mattia Pascolini, San Francisco, CA (US); Amin Tayebi, San Jose, CA (US); Aaron J. Cooper, San Jose, CA (US); Per Jakob Helander, Malmo (SE); Johan Avendal, Ystad (SE)

(73) Assignee: Apple Inc., Cupertino, CA (US)

( * ) Notice: Subject to any disclaimer, the term of this patent is extended or adjusted under 35 U.S.C. 154(b) by 375 days.

(21) Appl. No.: 17/026,974

(22) Filed: Sep. 21, 2020

(65) Prior Publication Data

US 2022/0094053 A1 Mar. 24, 2022

(51) Int. Cl.
*H01Q 1/24* (2006.01)
*H01Q 3/30* (2006.01)
*H01Q 9/04* (2006.01)

(52) U.S. Cl.
CPC ................. *H01Q 3/30* (2013.01); *H01Q 1/24* (2013.01); *H01Q 9/0414* (2013.01); *H01Q 9/0421* (2013.01)

(58) Field of Classification Search
CPC .......... H01Q 3/30; H01Q 1/24; H01Q 9/0414; H01Q 9/0421
See application file for complete search history.

(56) References Cited

U.S. PATENT DOCUMENTS 9,343,817 B2 5/2016 Pan
9,876,525 B1 * 1/2018 Khan .................... H04L 7/0331
(Continued)

FOREIGN PATENT DOCUMENTS

CN 208157615 U * 11/2018
KR 20190010448 A 1/2019
KR 20200070097 A 6/2020

OTHER PUBLICATIONS

Diaz, "Compact Ultra-Wideband Printed Inverted-F Antenna for Location Systems", 2018 Argentine Conference on Automatic Control (AADECA), Buenos Aires, Argentina, 2018, pp. 1-6 (Year: 2018).*

(Continued)

*Primary Examiner* — Dieu Hien T Duong
(74) *Attorney, Agent, or Firm* — Treyz Law Group, P.C.; Michael H. Lyons; Jinie M. Guihan

(57) ABSTRACT

An electronic device may include first and second phased antenna arrays and a triplet of first, second, and third ultra-wideband antennas. An antenna module in the device may include a dielectric substrate. The first and second arrays and the triplet may be formed on the dielectric substrate. The third and second ultra-wideband antennas may be separated by a gap. The first array may be laterally interposed between the third and second ultra-wideband antennas within the gap. The third ultra-wideband antenna may be laterally interposed between the first phased antenna array and at least some of the second array. An integrated circuit may be mounted to the dielectric substrate using an interposer. The antenna module may occupy a minimal amount of space within the device and may be less expensive to manufacture relative to scenarios where the arrays and the ultra-wideband antennas are formed on separate substrates.

20 Claims, 9 Drawing Sheets

(56) References Cited

U.S. PATENT DOCUMENTS

| | | | | |
|---|---|---|---|---|
| 10,658,762 | B2 | 5/2020 | Paulotto et al. | |
| 10,720,979 | B1 | 7/2020 | Paulotto et al. | |
| 2019/0020121 | A1* | 1/2019 | Paulotto | H01Q 21/28 |
| 2019/0097317 | A1* | 3/2019 | Di Nallo | H01Q 3/2605 |
| 2019/0157762 | A1* | 5/2019 | Shibata | H01Q 5/307 |
| 2019/0317177 | A1 | 10/2019 | Ertan et al. | |
| 2020/0021011 | A1 | 1/2020 | Cooper et al. | |
| 2020/0091608 | A1 | 3/2020 | Alpman et al. | |
| 2023/0119719 | A1* | 4/2023 | Kang | H01Q 9/0407 375/130 |
| 2023/0187849 | A1* | 6/2023 | Song | G01S 5/06 343/702 |

OTHER PUBLICATIONS

Ko, “Planar LTE/sub-6 GHz 5G MIMO antenna integrated with mmWave 5G beamforming phased array antennas for V2X applications”, IET Microwaves, Antennas & Propagation, pp. 1283-1295 (Year: 2020).*

U.S. Appl. No. 16/849,776, filed Apr. 15, 2020.

* cited by examiner

ELECTRONIC DEVICES HAVING MILLIMETER WAVE AND ULTRA-WIDEBAND ANTENNA MODULES

BACKGROUND

This relates generally to electronic devices and, more particularly, to electronic devices with wireless communications capabilities.

Electronic devices such as portable computers and cellular telephones are often provided with wireless communications capabilities. To satisfy consumer demand for small form factor wireless devices, manufacturers are continually striving to implement wireless communications circuitry such as antenna components using compact structures. At the same time, there is a desire for wireless devices to cover a growing number of communications bands.

Because antennas have the potential to interfere with each other and with components in a wireless device, care must be taken when incorporating antennas into an electronic device. Moreover, care must be taken to ensure that the antennas and wireless circuitry in a device are able to exhibit satisfactory performance over a range of operating frequencies and with satisfactory efficiency bandwidth.

It would therefore be desirable to be able to provide improved wireless communications circuitry for wireless electronic devices.

SUMMARY

An electronic device may be provided with wireless circuitry and a housing. The housing may have a housing wall. The wireless circuitry may include antennas that radiate through the housing wall. The antennas may include first and second phased antenna arrays and a triplet of first, second, and third ultra-wideband antennas. The first and second phased antenna arrays may radiate at first and second frequencies greater than 10 GHz. The first and second phased antenna arrays and the triplet of ultra-wideband antennas may be formed on the same antenna module.

The antenna module may have a dielectric substrate. The first and second phased antenna arrays and the triplet of ultra-wideband antennas may be formed on the dielectric substrate. The third and second ultra-wideband antennas may be separated by a gap. The first phased antenna array may be laterally interposed between the third and second ultra-wideband antennas within the gap. The third ultra-wideband antenna may be laterally interposed between the first phased antenna array and at least some of the second phased antenna array.

A radio-frequency integrated circuit (RFIC) may be mounted to the dielectric substrate using an interposer. The RFIC may include phase and magnitude controllers for the first and second phased antenna arrays. When configured in this way, the antenna module may occupy a minimal amount of space within the device. The antenna module may also require fewer interconnects and may be easier and less expensive to manufacture than in scenarios where the phased antenna arrays and the ultra-wideband antennas are formed on separate antenna modules.

DETAILED DESCRIPTION

Figure 1:
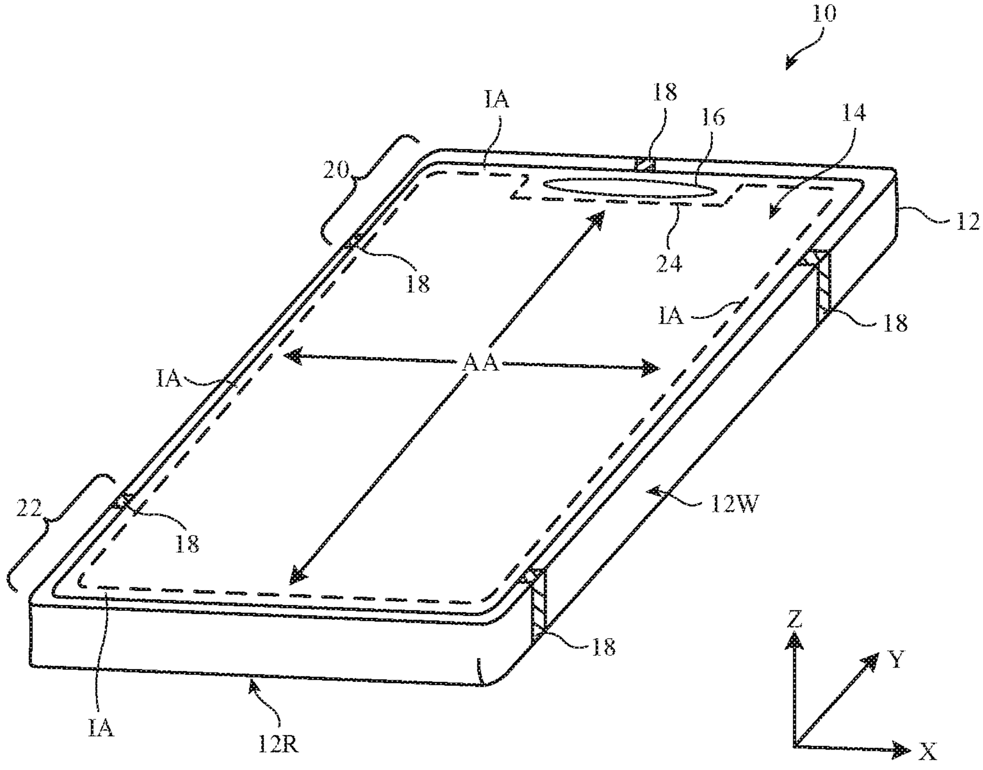
FIG. 1 is a perspective view of an illustrative electronic device in accordance with some embodiments.

An electronic device such as electronic device 10 of FIG. 1 may be provided with wireless circuitry that includes antennas. The antennas may be used to transmit and/or receive wireless radio-frequency signals.

Device 10 may be a portable electronic device or other suitable electronic device. For example, device 10 may be a laptop computer, a tablet computer, a somewhat smaller device such as a wrist-watch device, pendant device, headphone device, earpiece device, headset device, or other wearable or miniature device, a handheld device such as a cellular telephone, a media player, or other small portable device. Device 10 may also be a set-top box, a desktop computer, a display into which a computer or other processing circuitry has been integrated, a display without an integrated computer, a wireless access point, a wireless base station, an electronic device incorporated into a kiosk, building, or vehicle, or other suitable electronic equipment.

Device 10 may include a housing such as housing 12. Housing 12, which may sometimes be referred to as a case, may be formed of plastic, glass, ceramics, fiber composites, metal (e.g., stainless steel, aluminum, etc.), other suitable materials, or a combination of these materials. In some situations, parts of housing 12 may be formed from dielectric or other low-conductivity material (e.g., glass, ceramic, plastic, sapphire, etc.). In other situations, housing 12 or at least some of the structures that make up housing 12 may be formed from metal elements.

Device 10 may, if desired, have a display such as display 14. Display 14 may be mounted on the front face of device 10. Display 14 may be a touch screen that incorporates capacitive touch electrodes or may be insensitive to touch. The rear face of housing 12 (i.e., the face of device 10 opposing the front face of device 10) may have a substantially planar housing wall such as rear housing wall 12R (e.g., a planar housing wall). Rear housing wall 12R may have slots that pass entirely through the rear housing wall and that therefore separate portions of housing 12 from each other. Rear housing wall 12R may include conductive portions and/or dielectric portions. If desired, rear housing wall 12R may include a planar metal layer covered by a thin layer or coating of dielectric such as glass, plastic, sapphire, or ceramic (e.g., a dielectric cover layer). Housing 12 may also have shallow grooves that do not pass entirely through housing 12. The slots and grooves may be filled with plastic or other dielectric materials. If desired, portions of housing 12 that have been separated from each other (e.g., by a through slot) may be joined by internal conductive structures (e.g., sheet metal or other metal members that bridge the slot).

Housing 12 may include peripheral housing structures such as peripheral structures 12W. Conductive portions of peripheral structures 12W and conductive portions of rear housing wall 12R may sometimes be referred to herein collectively as conductive structures of housing 12. Peripheral structures 12W may run around the periphery of device 10 and display 14. In configurations in which device 10 and display 14 have a rectangular shape with four edges, peripheral structures 12W may be implemented using peripheral housing structures that have a rectangular ring shape with four corresponding edges and that extend from rear housing wall 12R to the front face of device 10 (as an example). In other words, device 10 may have a length (e.g., measured parallel to the Y-axis), a width that is less than the length (e.g., measured parallel to the X-axis), and a height (e.g., measured parallel to the Z-axis) that is less than the width. Peripheral structures 12W or part of peripheral structures 12W may serve as a bezel for display 14 (e.g., a cosmetic trim that surrounds all four sides of display 14 and/or that helps hold display 14 to device 10) if desired. Peripheral structures 12W may, if desired, form sidewall structures for device 10 (e.g., by forming a metal band with vertical sidewalls, curved sidewalls, etc.).

Peripheral structures 12W may be formed of a conductive material such as metal and may therefore sometimes be referred to as peripheral conductive housing structures, conductive housing structures, peripheral metal structures, peripheral conductive sidewalls, peripheral conductive sidewall structures, conductive housing sidewalls, peripheral conductive housing sidewalls, sidewalls, sidewall structures, or a peripheral conductive housing member (as examples). Peripheral conductive housing structures 12W may be formed from a metal such as stainless steel, aluminum, alloys, or other suitable materials. One, two, or more than two separate structures may be used in forming peripheral conductive housing structures 12W.

It is not necessary for peripheral conductive housing structures 12W to have a uniform cross-section. For example, the top portion of peripheral conductive housing structures 12W may, if desired, have an inwardly protruding ledge that helps hold display 14 in place. The bottom portion of peripheral conductive housing structures 12W may also have an enlarged lip (e.g., in the plane of the rear surface of device 10). Peripheral conductive housing structures 12W may have substantially straight vertical sidewalls, may have sidewalls that are curved, or may have other suitable shapes. In some configurations (e.g., when peripheral conductive housing structures 12W serve as a bezel for display 14), peripheral conductive housing structures 12W may run around the lip of housing 12 (i.e., peripheral conductive housing structures 12W may cover only the edge of housing 12 that surrounds display 14 and not the rest of the sidewalls of housing 12).

Rear housing wall 12R may lie in a plane that is parallel to display 14. In configurations for device 10 in which some or all of rear housing wall 12R is formed from metal, it may be desirable to form parts of peripheral conductive housing structures 12W as integral portions of the housing structures forming rear housing wall 12R. For example, rear housing wall 12R of device 10 may include a planar metal structure and portions of peripheral conductive housing structures 12W on the sides of housing 12 may be formed as flat or curved vertically extending integral metal portions of the planar metal structure (e.g., housing structures 12R and 12W may be formed from a continuous piece of metal in a unibody configuration). Housing structures such as these may, if desired, be machined from a block of metal and/or may include multiple metal pieces that are assembled together to form housing 12. Rear housing wall 12R may have one or more, two or more, or three or more portions. Peripheral conductive housing structures 12W and/or conductive portions of rear housing wall 12R may form one or more exterior surfaces of device 10 (e.g., surfaces that are visible to a user of device 10) and/or may be implemented using internal structures that do not form exterior surfaces of device 10 (e.g., conductive housing structures that are not visible to a user of device 10 such as conductive structures that are covered with layers such as thin cosmetic layers, protective coatings, and/or other coating/cover layers that may include dielectric materials such as glass, ceramic, plastic, or other structures that form the exterior surfaces of device 10 and/or serve to hide peripheral conductive housing structures 12W and/or conductive portions of rear housing wall 12R from view of the user).

Display 14 may have an array of pixels that form an active area AA that displays images for a user of device 10. For example, active area AA may include an array of display pixels. The array of pixels may be formed from liquid crystal display (LCD) components, an array of electrophoretic pixels, an array of plasma display pixels, an array of organic light-emitting diode display pixels or other light-emitting diode pixels, an array of electrowetting display pixels, or display pixels based on other display technologies. If desired, active area AA may include touch sensors such as touch sensor capacitive electrodes, force sensors, or other sensors for gathering a user input.

Display 14 may have an inactive border region that runs along one or more of the edges of active area AA. Inactive area IA of display 14 may be free of pixels for displaying images and may overlap circuitry and other internal device structures in housing 12. To block these structures from view by a user of device 10, the underside of the display cover layer or other layers in display 14 that overlap inactive area IA may be coated with an opaque masking layer in inactive area IA. The opaque masking layer may have any suitable color. Inactive area IA may include a recessed region such as notch 24 that extends into active area AA. Active area AA may, for example, be defined by the lateral area of a display module for display 14 (e.g., a display module that includes pixel circuitry, touch sensor circuitry, etc.). The display module may have a recess or notch in upper region 20 of device 10 that is free from active display circuitry (i.e., that forms notch 24 of inactive area IA). Notch 24 may be a substantially rectangular region that is surrounded (defined) on three sides by active area AA and on a fourth side by peripheral conductive housing structures 12W.

Display 14 may be protected using a display cover layer such as a layer of transparent glass, clear plastic, transparent ceramic, sapphire, or other transparent crystalline material, or other transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. The display cover layer may cover the entire front face of device 10. In another suitable arrangement, the display cover layer may cover substantially all of the front face of device 10 or only a portion of the front face of device 10. Openings may be formed in the display cover layer. For example, an opening may be formed in the display cover layer to accommodate a button. An opening may also be formed in the display cover layer to accommodate ports such as speaker port 16 in notch 24 or a microphone port. Openings may be formed in housing 12 to form communications ports (e.g., an audio jack port, a digital data port, etc.) and/or audio ports for audio components such as a speaker and/or a microphone if desired.

Display 14 may include conductive structures such as an array of capacitive electrodes for a touch sensor, conductive lines for addressing pixels, driver circuits, etc. Housing 12 may include internal conductive structures such as metal frame members and a planar conductive housing member (sometimes referred to as a conductive support plate or backplate) that spans the walls of housing 12 (e.g., a substantially rectangular sheet formed from one or more metal parts that is welded or otherwise connected between opposing sides of peripheral conductive housing structures 12W). The conductive support plate may form an exterior rear surface of device 10 or may be covered by a dielectric cover layer such as a thin cosmetic layer, protective coating, and/or other coatings that may include dielectric materials such as glass, ceramic, plastic, or other structures that form the exterior surfaces of device 10 and/or serve to hide the conductive support plate from view of the user (e.g., the conductive support plate may form part of rear housing wall 12R). Device 10 may also include conductive structures such as printed circuit boards, components mounted on printed circuit boards, and other internal conductive structures. These conductive structures, which may be used in forming a ground plane in device 10, may extend under active area AA of display 14, for example.

In regions 22 and 20, openings may be formed within the conductive structures of device 10 (e.g., between peripheral conductive housing structures 12W and opposing conductive ground structures such as conductive portions of rear housing wall 12R, conductive traces on a printed circuit board, conductive electrical components in display 14, etc.). These openings, which may sometimes be referred to as gaps, may be filled with air, plastic, and/or other dielectrics and may be used in forming slot antenna resonating elements for one or more antennas in device 10, if desired.

Conductive housing structures and other conductive structures in device 10 may serve as a ground plane for the antennas in device 10. The openings in regions 22 and 20 may serve as slots in open or closed slot antennas, may serve as a central dielectric region that is surrounded by a conductive path of materials in a loop antenna, may serve as a space that separates an antenna resonating element such as a strip antenna resonating element or an inverted-F antenna resonating element from the ground plane, may contribute to the performance of a parasitic antenna resonating element, or may otherwise serve as part of antenna structures formed in regions 22 and 20. If desired, the ground plane that is under active area AA of display 14 and/or other metal structures in device 10 may have portions that extend into parts of the ends of device 10 (e.g., the ground may extend towards the dielectric-filled openings in regions 22 and 20), thereby narrowing the slots in regions 22 and 20. Region 22 may sometimes be referred to herein as lower region 22 or lower end 22 of device 10. Region 20 may sometimes be referred to herein as upper region 20 or upper end 20 of device 10.

In general, device 10 may include any suitable number of antennas (e.g., one or more, two or more, three or more, four or more, etc.). The antennas in device 10 may be located at opposing first and second ends of an elongated device housing (e.g., at lower region 22 and/or upper region 20 of device 10 of FIG. 1), along one or more edges of a device housing, in the center of a device housing, in other suitable locations, or in one or more of these locations. The arrangement of FIG. 1 is merely illustrative.

Portions of peripheral conductive housing structures 12W may be provided with peripheral gap structures. For example, peripheral conductive housing structures 12W may be provided with one or more dielectric-filled gaps such as gaps 18, as shown in FIG. 1. The gaps in peripheral conductive housing structures 12W may be filled with dielectric such as polymer, ceramic, glass, air, other dielectric materials, or combinations of these materials. Gaps 18 may divide peripheral conductive housing structures 12W into one or more peripheral conductive segments. The conductive segments that are formed in this way may form parts of antennas in device 10 if desired. Other dielectric openings may be formed in peripheral conductive housing structures 12W (e.g., dielectric openings other than gaps 18) and may serve as dielectric antenna windows for antennas mounted within the interior of device 10. Antennas within device 10 may be aligned with the dielectric antenna windows for conveying radio-frequency signals through peripheral conductive housing structures 12W. Antennas within device 10 may also be aligned with inactive area IA of display 14 for conveying radio-frequency signals through display 14.

In order to provide an end user of device 10 with as large of a display as possible (e.g., to maximize an area of the device used for displaying media, running applications, etc.), it may be desirable to increase the amount of area at the front face of device 10 that is covered by active area AA of display 14. Increasing the size of active area AA may reduce the size of inactive area IA within device 10. This may reduce the area behind display 14 that is available for antennas within device 10. For example, active area AA of display 14 may include conductive structures that serve to block radio-frequency signals handled by antennas mounted behind active area AA from radiating through the front face of device 10. It would therefore be desirable to be able to provide antennas that occupy a small amount of space within device 10 (e.g., to allow for as large of a display active area AA as possible) while still allowing the antennas to communicate with wireless equipment external to device 10 with satisfactory efficiency bandwidth.

In a typical scenario, device 10 may have one or more upper antennas and one or more lower antennas. An upper antenna may, for example, be formed in upper region 20 of device 10. A lower antenna may, for example, be formed in lower region 22 of device 10. Additional antennas may be formed along the edges of housing 12 extending between regions 20 and 22 if desired. An example in which device 10 includes three or four upper antennas and five lower antennas is described herein as an example. The antennas may be used separately to cover identical communications bands, overlapping communications bands, or separate communications bands. The antennas may be used to implement an antenna diversity scheme or a multiple-input-multiple-output (MIMO) antenna scheme. Other antennas for covering any other desired frequencies may also be mounted at any desired locations within the interior of device 10. The example of FIG. 1 is merely illustrative. If desired, housing 12 may have other shapes (e.g., a square shape, cylindrical shape, spherical shape, combinations of these and/or different shapes, etc.).

Figure 2:
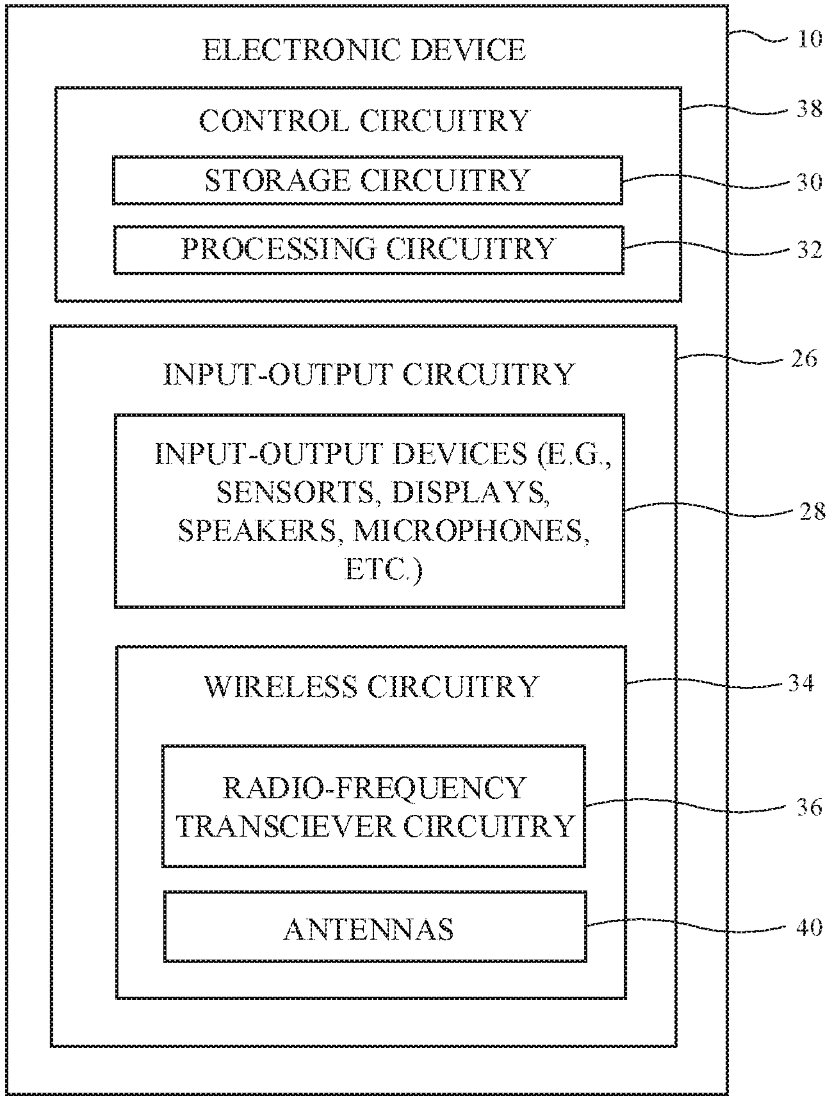
FIG. 2 is a schematic diagram of illustrative circuitry in an electronic device in accordance with some embodiments.

A schematic diagram of illustrative components that may be used in device 10 is shown in FIG. 2. As shown in FIG. 2, device 10 may include control circuitry 38. Control circuitry 38 may include storage such as storage circuitry 30. Storage circuitry 30 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 38 may include processing circuitry such as processing circuitry 32. Processing circuitry 32 may be used to control the operation of device 10. Processing circuitry 32 may include on one or more microprocessors, microcontrollers, digital signal processors, host processors, baseband processor integrated circuits, application specific integrated circuits, central processing units (CPUs), etc. Control circuitry 38 may be configured to perform operations in device 10 using hardware (e.g., dedicated hardware or circuitry), firmware, and/or software. Software code for performing operations in device 10 may be stored on storage circuitry 30 (e.g., storage circuitry 30 may include non-transitory (tangible) computer readable storage media that stores the software code). The software code may sometimes be referred to as program instructions, software, data, instructions, or code. Software code stored on storage circuitry 30 may be executed by processing circuitry 32.

Control circuitry 38 may be used to run software on device 10 such as internet browsing applications, voice-over-internet-protocol (VOIP) telephone call applications, email applications, media playback applications, operating system functions, etc. To support interactions with external equipment, control circuitry 38 may be used in implementing communications protocols. Communications protocols that may be implemented using control circuitry 38 include internet protocols, wireless local area network protocols (e.g., IEEE 802.11 protocols—sometimes referred to as WiFi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 26. Input-output circuitry 26 may include input-output devices 28. Input-output devices 28 may be used to allow data to be supplied to device 10 and to allow data to be provided from device 10 to external devices. Input-output devices 28 may include user interface devices, data port devices, sensors, and other input-output components. For example, input-output devices may include touch screens, displays without touch sensor capabilities, buttons, joysticks, scrolling wheels, touch pads, key pads, keyboards, microphones, cameras, speakers, status indicators, light sources, audio jacks and other audio port components, digital data port devices, light sensors, gyroscopes, accelerometers or other components that can detect motion and device orientation relative to the Earth, capacitance sensors, proximity sensors (e.g., a capacitive proximity sensor and/or an infrared proximity sensor), magnetic sensors, and other sensors and input-output components.

Input-output circuitry 26 may include wireless circuitry such as wireless circuitry 34 for wirelessly conveying radio-frequency signals. While control circuitry 38 is shown separately from wireless circuitry 34 in the example of FIG. 2 for the sake of clarity, wireless circuitry 34 may include processing circuitry that forms a part of processing circuitry 32 and/or storage circuitry that forms a part of storage circuitry 30 of control circuitry 38 (e.g., portions of control circuitry 38 may be implemented on wireless circuitry 34). As an example, control circuitry 38 may include baseband processor circuitry or other control components that form a part of wireless circuitry 34.

Wireless circuitry 34 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless circuitry 34 may include radio-frequency transceiver circuitry 36 for handling transmission and/or reception of radio-frequency signals in various radio-frequency communications bands. For example, radio-frequency transceiver circuitry 36 may handle wireless local area network (WLAN) communications bands such as the 2.4 GHz and 5 GHz Wi-Fi® (IEEE 802.11) bands, wireless personal area network (WPAN) communications bands such as the 2.4 GHz Bluetooth® communications band, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz (e.g., 3G bands. 4G LTE bands, 5G New Radio Frequency Range 1 (FR1) bands below 10 GHz. 5G New Radio Frequency Range 2 (FR2) bands at millimeter and centimeter wavelengths between 20 and 60 GHz, etc.), a near-field communications (NFC) band (e.g., at 13.56 MHz), satellite navigations bands (e.g., an L1 global positioning system (GPS) band at 1575 MHz, an L5 GPS band at 1176 MHz, a Global Navigation Satellite System (GLONASS) band, a BeiDou Navigation Satellite System (BDS) band, etc.), ultra-wideband (UWB) communications band(s) supported by the IEEE 802.15.4 protocol and/or other UWB communications protocols (e.g., a first UWB communications band at 6.5 GHz and/or a second UWB communications band at 8.0 GHz), and/or any other desired communications bands. The communications bands handled by radio-frequency transceiver circuitry 36 may sometimes be referred to herein as frequency bands or simply as "bands," and may span corresponding ranges of frequencies.

The UWB communications handled by radio-frequency transceiver circuitry 36 may be based on an impulse radio signaling scheme that uses band-limited data pulses. Radio-frequency signals in the UWB frequency band may have any desired bandwidths such as bandwidths between 499 MHz and 1331 MHz, bandwidths greater than 500 MHz, etc. The presence of lower frequencies in the baseband may sometimes allow ultra-wideband signals to penetrate through objects such as walls. In an IEEE 802.15.4 system, for example, a pair of electronic devices may exchange wireless time stamped messages. Time stamps in the messages may be analyzed to determine the time of flight of the messages and thereby determine the distance (range) between the devices and/or an angle between the devices (e.g., an angle of arrival of incoming radio-frequency signals).

Radio-frequency transceiver circuitry 36 may include respective transceivers (e.g., transceiver integrated circuits or chips) that handle each of these frequency bands or any desired number of transceivers that handle two or more of these frequency bands. In scenarios where different transceivers are coupled to the same antenna, filter circuitry (e.g., duplexer circuitry, diplexer circuitry, low pass filter circuitry, high pass filter circuitry, band pass filter circuitry, band stop filter circuitry, etc.), switching circuitry, multiplexing circuitry, or any other desired circuitry may be used to isolate radio-frequency signals conveyed by each transceiver over the same antenna (e.g., filtering circuitry or multiplexing circuitry may be interposed on a radio-frequency transmission line shared by the transceivers). Radio-frequency transceiver circuitry 36 may include one or more integrated circuits (chips), integrated circuit packages (e.g., multiple integrated circuits mounted on a common printed circuit in a system-in-package device, one or more integrated circuits mounted on different substrates, etc.), power amplifier circuitry, up-conversion circuitry, down-conversion circuitry, low-noise input amplifiers, passive radio-frequency components, switching circuitry, transmission line structures, and other circuitry for handling radio-frequency signals and/or for converting signals between radio-frequencies, intermediate frequencies, and/or baseband frequencies.

In general, radio-frequency transceiver circuitry 36 may cover (handle) any desired frequency bands of interest. As shown in FIG. 2, wireless circuitry 34 may include antennas 40. Radio-frequency transceiver circuitry 36 may convey radio-frequency signals using one or more antennas 40 (e.g., antennas 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to freespace through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Antennas 40 in wireless circuitry 34 may be formed using any suitable antenna types. For example, antennas 40 may include antennas with resonating elements that are formed from stacked patch antenna structures, loop antenna structures, patch antenna structures, inverted-F antenna structures, slot antenna structures, planar inverted-F antenna structures, waveguide structures, monopole antenna structures, dipole antenna structures, helical antenna structures, Yagi (Yagi-Uda) antenna structures, hybrids of these designs, etc. In another suitable arrangement, antennas 40 may include antennas with dielectric resonating elements such as dielectric resonator antennas. If desired, one or more of antennas 40 may be cavity-backed antennas. Two or more antennas 40 may be arranged in a phased antenna array if desired (e.g., for conveying centimeter and/or millimeter wave signals). Different types of antennas may be used for different bands and combinations of bands.

In one suitable arrangement that is described herein as an example, antennas 40 include a first set of antennas for conveying radio-frequency signals in UWB frequency band(s) and a second set of antennas that form one or more phased antenna arrays. The first set of antennas may include a triplet or doublet of antennas for conveying radio-frequency signals in UWB frequency bands (sometimes referred to herein as UWB antennas). The phased antenna arrays may convey radio-frequency signals using millimeter and/or centimeter wave signals. Millimeter wave signals, which are sometimes referred to as extremely high frequency (EHF) signals, propagate at frequencies above about 30 GHz (e.g., at 60 GHz or other frequencies between about 30 GHz and 300 GHz). Centimeter wave signals propagate at frequencies between about 10 GHz and 30 GHz. In one suitable arrangement that is described herein as an example, each phased antenna array may convey radio-frequency signals in a first 5G NR FR2 frequency band around 24-30 GHz and a second 5G NR FR2 frequency band around 37-43 GHz. Each phased antenna array may include a first set of antennas that convey radio-frequency signals in the first 5G NR FR2 frequency band and a second set of antennas that convey radio-frequency signals in the second 5G NR FR2 frequency band, for example.

Figure 3:
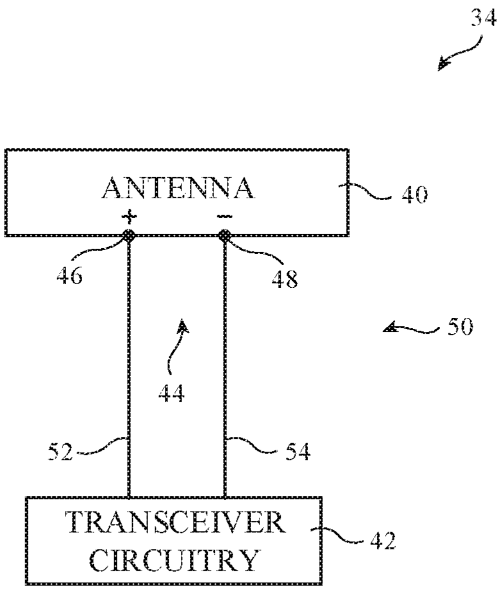
FIG. 3 is a schematic diagram of illustrative wireless circuitry in accordance with some embodiments.

A schematic diagram of wireless circuitry 34 is shown in FIG. 3. As shown in FIG. 3, wireless circuitry 34 may include transceiver circuitry 36 that is coupled to a given antenna 40 using a radio-frequency transmission line path such as radio-frequency transmission line path 50.

To provide antenna structures such as antenna 40 with the ability to cover different frequencies of interest, antenna 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna 40 may be provided with adjustable circuits such as tunable components that tune the antenna over communications (frequency) bands of interest. The tunable components may be part of a tunable filter or tunable impedance matching network, may be part of an antenna resonating element, may span a gap between an antenna resonating element and antenna ground, etc.

Radio-frequency transmission line path 50 may include one or more radio-frequency transmission lines (sometimes referred to herein simply as transmission lines). Radio-frequency transmission line path 50 (e.g., the transmission lines in radio-frequency transmission line path 50) may include a positive signal conductor such as positive signal conductor 52 and a ground signal conductor such as ground conductor 54.

The transmission lines in radio-frequency transmission line path 50 may, for example, include coaxial cable transmission lines (e.g., ground conductor 54 may be implemented as a grounded conductive braid surrounding signal conductor 52 along its length), stripline transmission lines (e.g., where ground conductor 54 extends along two sides of signal conductor 52), a microstrip transmission line (e.g., where ground conductor 54 extends along one side of signal conductor 52), coaxial probes realized by a metalized via, edge-coupled microstrip transmission lines, edge-coupled stripline transmission lines, waveguide structures (e.g., coplanar waveguides or grounded coplanar waveguides), combinations of these types of transmission lines and/or other transmission line structures, etc. In one suitable arrangement that is sometimes described herein as an example, radio-frequency transmission line path 50 may include a stripline transmission line coupled to transceiver circuitry 36 and a microstrip transmission line coupled between the stripline transmission line and antenna 40.

Transmission lines in radio-frequency transmission line path 50 may be integrated into rigid and/or flexible printed circuit boards. In one suitable arrangement, radio-frequency transmission line path 50 may include transmission line conductors (e.g., signal conductors 52 and ground conductors 54) integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

A matching network may include components such as inductors, resistors, and capacitors used in matching the impedance of antenna 40 to the impedance of radio-frequency transmission line path 50. Matching network components may be provided as discrete components (e.g., surface mount technology components) or may be formed from housing structures, printed circuit board structures, traces on plastic supports, etc. Components such as these may also be used in forming filter circuitry in antenna(s) 40 and may be tunable and/or fixed components.

Radio-frequency transmission line path 50 may be coupled to antenna feed structures associated with antenna 40. As an example, antenna 40 may form an inverted-F antenna, a planar inverted-F antenna, a patch antenna, or other antenna having an antenna feed 44 with a positive antenna feed terminal such as positive antenna feed terminal 46 and a ground antenna feed terminal such as ground antenna feed terminal 48. Positive antenna feed terminal 46 may be coupled to an antenna resonating element for antenna 40. Ground antenna feed terminal 48 may be coupled to an antenna ground for antenna 40.

Signal conductor 52 may be coupled to positive antenna feed terminal 46 and ground conductor 54 may be coupled to ground antenna feed terminal 48. Other types of antenna feed arrangements may be used if desired. For example, antenna 40 may be fed using multiple feeds each coupled to a respective port of transceiver circuitry 36 over a corresponding transmission line. If desired, signal conductor 52 may be coupled to multiple locations on antenna 40 (e.g., antenna 40 may include multiple positive antenna feed terminals coupled to signal conductor 52 of the same radio-frequency transmission line path 50). Switches may be interposed on the signal conductor between transceiver circuitry 36 and the positive antenna feed terminals if desired (e.g., to selectively activate one or more positive antenna feed terminals at any given time). The illustrative feeding configuration of FIG. 3 is merely illustrative.

During operation, device 10 may communicate with external wireless equipment. If desired, device 10 may use radio-frequency signals conveyed between device 10 and the external wireless equipment to identify a location of the external wireless equipment relative to device 10. Device 10 may identify the relative location of the external wireless equipment by identifying a range to the external wireless equipment (e.g., the distance between the external wireless equipment and device 10) and the angle of arrival (AoA) of radio-frequency signals from the external wireless equipment (e.g., the angle at which radio-frequency signals are received by device 10 from the external wireless equipment).

Figure 4:
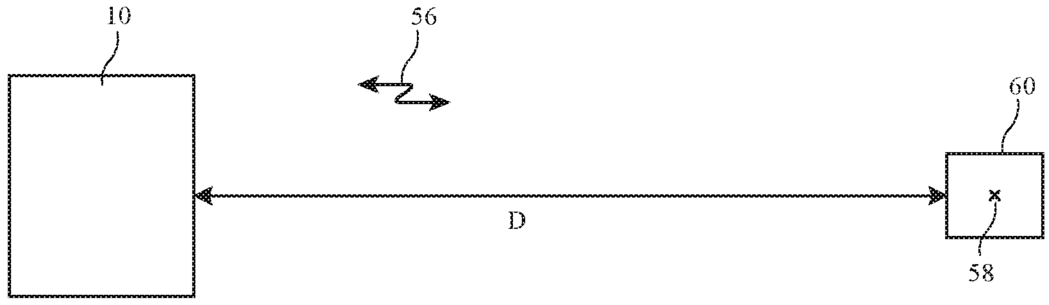
FIG. 4 is a diagram of an illustrative electronic device in wireless communication with an external node in a network in accordance with some embodiments.

FIG. 4 is a diagram showing how device 10 may determine a distance D between device 10 and external wireless equipment such as wireless network node 60 (sometimes referred to herein as wireless equipment 60, wireless device 60, external device 60, or external equipment 60). Node 60 may include devices that are capable of receiving and/or transmitting radio-frequency signals such as radio-frequency signals 56. Node 60 may include tagged devices (e.g., any suitable object that has been provided with a wireless receiver and/or a wireless transmitter), electronic equipment (e.g., an infrastructure-related device), and/or other electronic devices (e.g., devices of the type described in connection with FIG. 1, including some or all of the same wireless communications capabilities as device 10).

For example, node 60 may be a laptop computer, a tablet computer, a somewhat smaller device such as a wrist-watch device, pendant device, headphone device, earpiece device, headset device (e.g., virtual or augmented reality headset devices), or other wearable or miniature device, a handheld device such as a cellular telephone, a media player, or other small portable device. Node 60 may also be a set-top box, a camera device with wireless communications capabilities, a desktop computer, a display into which a computer or other processing circuitry has been integrated, a display without an integrated computer, or other suitable electronic equipment. Node 60 may also be a key fob, a wallet, a book, a pen, or other object that has been provided with a low-power transmitter (e.g., an RFID transmitter or other transmitter). Node 60 may be electronic equipment such as a thermostat, a smoke detector, a Bluetooth® Low Energy (Bluetooth LE) beacon, a Wi-Fi® wireless access point, a wireless base station, a server, a heating, ventilation, and air conditioning (HVAC) system (sometimes referred to as a temperature-control system), a light source such as a light-emitting diode (LED) bulb, a light switch, a power outlet, an occupancy detector (e.g., an active or passive infrared light detector, a microwave detector, etc.), a door sensor, a moisture sensor, an electronic door lock, a security camera, or other device. Device 10 may also be one of these types of devices if desired.

As shown in FIG. 4, device 10 may communicate with node 60 using wireless radio-frequency signals 56. Radio-frequency signals 56 may include Bluetooth® signals, near-field communications signals, wireless local area network signals such as IEEE 802.11 signals, millimeter wave communication signals such as signals at 60 GHz. UWB signals, other radio-frequency wireless signals, infrared signals, etc. In one suitable arrangement that is described herein by example, radio-frequency signals 56 are UWB signals conveyed in multiple UWB communications bands such as the 6.5 GHz and 8 GHz UWB communications bands. Radio-frequency signals 56 may be used to determine and/or convey information such as location and orientation information. For example, control circuitry 38 in device 10 (FIG. 2) may determine the location 58 of node 60 relative to device 10 using radio-frequency signals 56.

In arrangements where node 60 is capable of sending or receiving communications signals, control circuitry 38 (FIG. 2) on device 10 may determine distance D using radio-frequency signals 56 of FIG. 4. The control circuitry may determine distance D using signal strength measurement schemes (e.g., measuring the signal strength of radio-frequency signals 56 from node 60) or using time-based measurement schemes such as time of flight measurement techniques, time difference of arrival measurement techniques, angle of arrival measurement techniques, triangulation methods, time-of-flight methods, using a crowdsourced location database, and other suitable measurement techniques. This is merely illustrative, however. If desired, the control circuitry may use information from Global Positioning System receiver circuitry, proximity sensors (e.g., infrared proximity sensors or other proximity sensors), image data from a camera, motion sensor data from motion sensors, and/or using other circuitry on device 10 to help determine distance D. In addition to determining the distance D between device 10 and node 60, the control circuitry may determine the orientation of device 10 relative to node 60.

Figure 5:
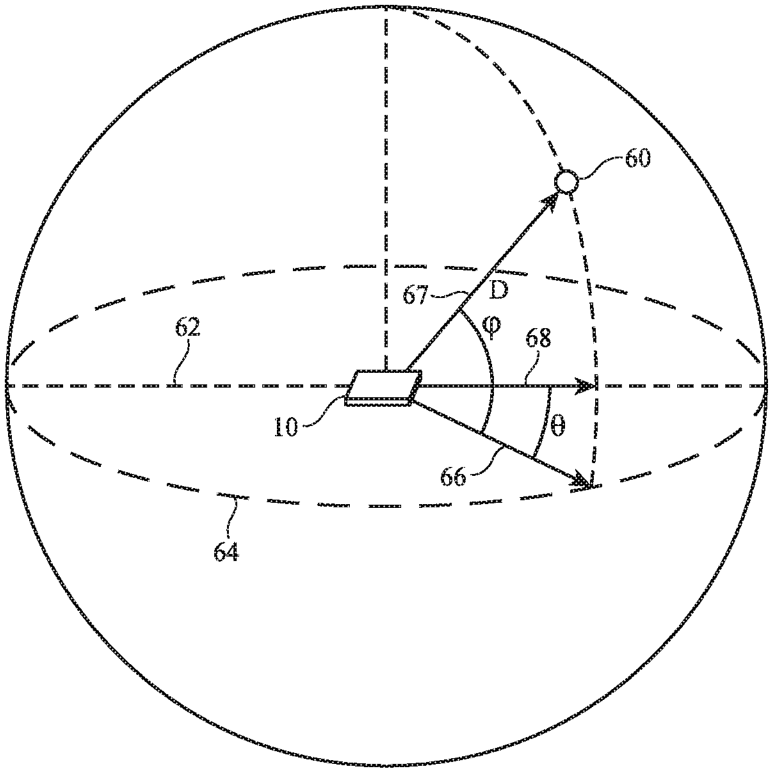
FIG. 5 is a diagram showing how the location (e.g., range and angle of arrival) of an external node in a network may be determined relative to an electronic device in accordance with some embodiments.

FIG. 5 illustrates how the position and orientation of device 10 relative to nearby nodes such as node 60 may be determined. In the example of FIG. 5, the control circuitry on device 10 (e.g., control circuitry 38 of FIG. 2) uses a horizontal polar coordinate system to determine the location and orientation of device 10 relative to node 60. In this type of coordinate system, the control circuitry may determine an azimuth angle θ and/or an elevation angle φ to describe the position of nearby nodes 60 relative to device 10. The control circuitry may define a reference plane such as local horizon 64 and a reference vector such as reference vector 68. Local horizon 64 may be a plane that intersects device 10 and that is defined relative to a surface of device 10 (e.g., the front or rear face of device 10). For example, local horizon 64 may be a plane that is parallel to or coplanar with display 14 of device 10 (FIG. 1). Reference vector 68 (sometimes referred to as the "north" direction) may be a vector in local horizon 64. If desired, reference vector 68 may be aligned with longitudinal axis 62 of device 10 (e.g., an axis running lengthwise down the center of device 10 and parallel to the longest rectangular dimension of device 10, parallel to the Y-axis of FIG. 1). When reference vector 68 is aligned with longitudinal axis 62 of device 10, reference vector 68 may correspond to the direction in which device 10 is being pointed.

Azimuth angle θ and elevation angle (may be measured relative to local horizon 64 and reference vector 68. As shown in FIG. 5, the elevation angle φ (sometimes referred to as altitude) of node 60 is the angle between node 60 and local horizon 64 of device 10 (e.g., the angle between vector 67 extending between device 10 and node 60 and a coplanar vector 66 extending between device 10 and local horizon 64). The azimuth angle θ of node 60 is the angle of node 60 around local horizon 64 (e.g., the angle between reference vector 68 and vector 66). In the example of FIG. 5, the azimuth angle θ and elevation angle φ of node 60 are greater than 0°.

If desired, other axes besides longitudinal axis 62 may be used to define reference vector 68. For example, the control circuitry may use a horizontal axis that is perpendicular to longitudinal axis 62 as reference vector 68. This may be useful in determining when nodes 60 are located next to a side portion of device 10 (e.g., when device 10 is oriented side-to-side with one of nodes 60).

After determining the orientation of device 10 relative to node 60, the control circuitry on device 10 may take suitable action. For example, the control circuitry may send information to node 60, may request and/or receive information from 60, may use display 14 (FIG. 1) to display a visual indication of wireless pairing with node 60, may use speakers to generate an audio indication of wireless pairing with node 60, may use a vibrator, a haptic actuator, or other mechanical element to generate haptic output indicating wireless pairing with node 60, may use display 14 to display a visual indication of the location of node 60 relative to device 10, may use speakers to generate an audio indication of the location of node 60, may use a vibrator, a haptic actuator, or other mechanical element to generate haptic output indicating the location of node 60, and/or may take other suitable action.

In one suitable arrangement, device 10 may determine the distance between the device 10 and node 60 and the orientation of device 10 relative to node 60 using two or more ultra-wideband antennas. The ultra-wide band antennas may receive radio-frequency signals from node 60 (e.g., radio-frequency signals 56 of FIG. 4). Time stamps in the wireless communication signals may be analyzed to determine the time of flight of the wireless communication signals and thereby determine the distance (range) between device 10 and node 60. Additionally, angle of arrival (AoA) measurement techniques may be used to determine the orientation of electronic device 10 relative to node 60 (e.g., azimuth angle θ and elevation angle φ).

In angle of arrival measurement, node 60 transmits a radio-frequency signal to device 10 (e.g., radio-frequency signals 56 of FIG. 4). Device 10 may measure a delay in arrival time of the radio-frequency signals between the two or more ultra-wideband antennas. The delay in arrival time (e.g., the difference in received phase at each ultra-wideband antenna) can be used to determine the angle of arrival of the radio-frequency signal (and therefore the angle of node 60 relative to device 10). Once distance D and the angle of arrival have been determined, device 10 may have knowledge of the precise location of node 60 relative to device 10.

Figure 6:
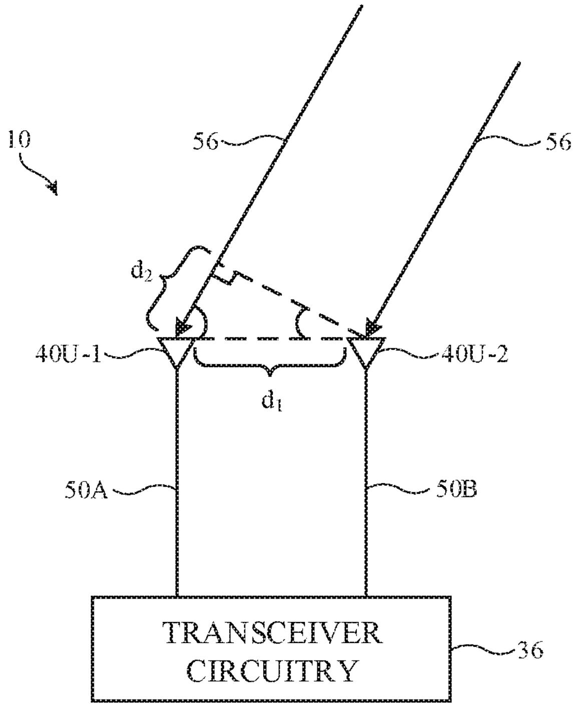
FIG. 6 is a diagram showing how illustrative ultra-wideband antennas in an electronic device may be used for detecting angle of arrival in accordance with some embodiments.

FIG. 6 is a schematic diagram showing how angle of arrival measurement techniques may be used to determine the orientation of device 10 relative to node 60. Device 10 may include multiple antennas 40 for conveying radio-frequency signals in one or more UWB frequency bands (sometimes referred to herein as ultra-wideband antennas 40U). As shown in FIG. 6, the ultra-wideband antennas 40U in device 10 may include at least a first ultra-wideband antenna 40U-1 and a second ultra-wideband antenna 40U-2. Ultra-wideband antennas 40U-1 and 40U-2 may be coupled to transceiver circuitry 36 over respective radio-frequency transmission line paths 50 (e.g., a first radio-frequency transmission line path 50A and a second radio-frequency transmission line path 50B). Transceiver circuitry 36 and ultra-wideband antennas 40U-1 and 40U-2 may operate at UWB frequencies (e.g., transceiver circuitry 36 may convey UWB signals using ultra-wideband antennas 40U-1 and 40U-2).

Ultra-wideband antennas 40U-1 and 40U-2 may each receive radio-frequency signals 56 from node 60 (FIG. 5). Ultra-wideband antennas 40U-1 and 40U-2 may be laterally separated by a distance $d_1$, where ultra-wideband antenna 40U-1 is farther away from node 60 than ultra-wideband antenna 40U-2 (in the example of FIG. 6). Therefore, radio-frequency signals 56 travel a greater distance to reach ultra-wideband antenna 40U-1 than ultra-wideband antenna 40U-2. The additional distance between node 60 and ultra-wideband antenna 40U-1 is shown in FIG. 6 as distance $d_2$. FIG. 6 also shows angles a and b (where a+b=90°).

Distance $d_2$ may be determined as a function of angle a or angle b (e.g., $d_2=d_1*\sin(a)$ or $d_2=d_1*\cos(b)$). Distance $d_2$ may also be determined as a function of the phase difference between the signal received by ultra-wideband antenna 40U-1 and the signal received by ultra-wideband antenna 40U-2 (e.g., $d_2=(PD)*\lambda/(2*\pi)$), where PD is the phase difference (sometimes written "$\Delta\phi$") between the signal received by ultra-wideband antenna 40U-1 and the signal received by ultra-wideband antenna 40U-2, and $\lambda$ is the wavelength of radio-frequency signals 56. Device 10 may include phase measurement circuitry coupled to each antenna to measure the phase of the received signals and to identify phase difference PD (e.g., by subtracting the phase measured for one antenna from the phase measured for the other antenna). The two equations for $d_2$ may be set equal to each other (e.g., $d_1*\sin(a)=(PD)*\lambda/(2*\pi)$) and rearranged to solve for the angle a (e.g., $a=\sin^{-1}((PD)*\lambda/(2*\pi*d_1))$ or the angle b. Therefore, the angle of arrival may be determined (e.g., by control circuitry 38 of FIG. 2) based on the known (predetermined) distance $d_1$ between ultra-wideband antennas 40U-1 and 40U-2, the detected (measured) phase difference PD between the signal received by ultra-wideband antenna 40U-1 and the signal received by ultra-wideband antenna 40U-2, and the known wavelength (frequency) of the received radio-frequency signals 56. Angles a and/or b of FIG. 6 may be converted to spherical coordinates to obtain azimuth angle $\theta$ and elevation angle $\varphi$ of FIG. 5, for example. Control circuitry 38 (FIG. 2) may determine the angle of arrival of radio-frequency signals 56 by calculating one or both of azimuth angle $\theta$ and elevation angle $\varphi$.

Distance $d_1$ may be selected to ease the calculation for phase difference PD between the signal received by ultra-wideband antenna 40U-1 and the signal received by ultra-wideband antenna 40U-2. For example, $d_1$ may be less than or equal to one half of the wavelength (e.g., effective wavelength) of the received radio-frequency signals 56 (e.g., to avoid multiple phase difference solutions).

With two antennas for determining angle of arrival (as in FIG. 6), the angle of arrival within a single plane may be determined. For example, ultra-wideband antennas 40U-1 and 40U-2 in FIG. 6 may be used to determine azimuth angle $\theta$ of FIG. 5. A third ultra-wideband antenna may be included to enable angle of arrival determination in multiple planes (e.g., azimuth angle $\theta$ and elevation angle $\varphi$ of FIG. 5 may both be determined). The three ultra-wideband antennas in this scenario may form a so-called triplet of ultra-wideband antennas, where each antenna in the triplet is arranged to approximately lie on a respective corner of a right triangle (e.g., the triplet may include ultra-wideband antennas 40U-1 and 40U-2 of FIG. 6 and a third antenna located at distance $d_1$ from ultra-wideband antenna 40U-1 in a direction perpendicular to the vector between ultra-wideband antennas 40U-1 and 40U-2) or using some other predetermined relative positioning. Triplets of ultra-wideband antennas 40U may be used to determine angle of arrival in two planes (e.g., to determine both azimuth angle $\theta$ and elevation angle (p of FIG. 5). Triplets of ultra-wideband antennas 40U and/or doublets of ultra-wideband antennas 40U (e.g., a pair of antennas such as ultra-wideband antennas 40U-1 and 40U-2 of FIG. 6) may be used in device 10 to determine angle of arrival. If desired, different doublets of antennas may be oriented orthogonally with respect to each other in device 10 to recover angle of arrival in two dimensions (e.g., using two or more orthogonal doublets of ultra-wideband antennas 40U that each measure angle of arrival in a single respective plane).

Figure 7:
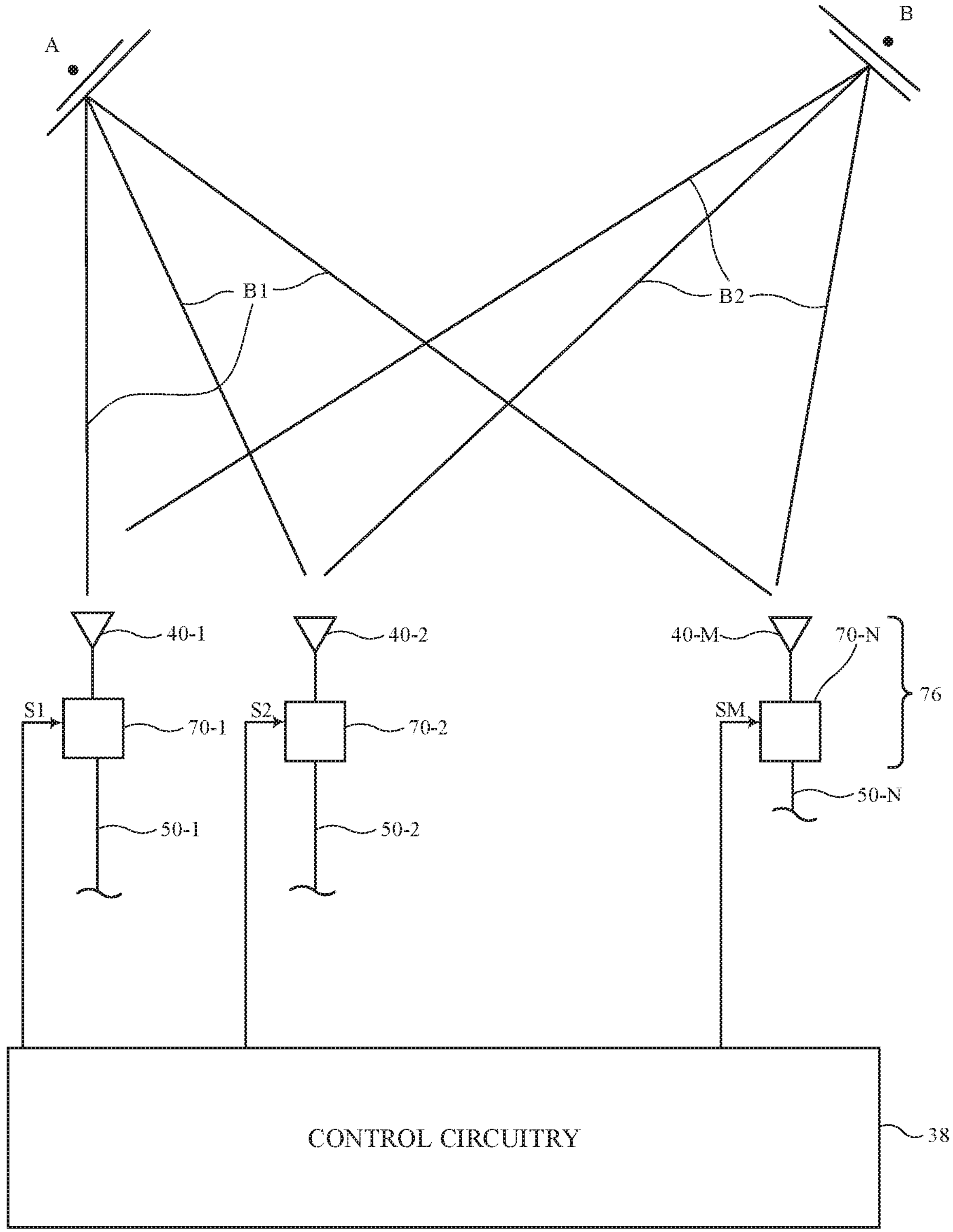
FIG. 7 is a diagram of an illustrative phased antenna array that may be adjusted using control circuitry to direct a beam of signals in accordance with some embodiments.

The antennas 40 in device 10 may also include two or more antennas 40 that convey radio-frequency signals at frequencies greater than 10 GHz. Due to the substantial signal attenuation at frequencies greater than 10 GHz, these antennas may be arranged into one or more corresponding phased antenna arrays. FIG. 7 shows how antennas 40 for handling radio-frequency signals at millimeter and centimeter wave frequencies may be formed in a corresponding phased antenna array 76.

As shown in FIG. 7, phased antenna array 76 (sometimes referred to herein as array 76, antenna array 76, or array 76 of antennas 40) may be coupled to radio-frequency transmission line paths 50. For example, a first antenna 40-1 in phased antenna array 76 may be coupled to a first radio-frequency transmission line path 50-1, a second antenna 40-2 in phased antenna array 76 may be coupled to a second radio-frequency transmission line path 50-2, an Nth antenna 40-N in phased antenna array 76 may be coupled to an Nth radio-frequency transmission line path 50-N, etc. While antennas 40 are described herein as forming a phased antenna array, the antennas 40 in phased antenna array 76 may sometimes also be referred to as collectively forming a single phased array antenna.

Antennas 40 in phased antenna array 76 may be arranged in any desired number of rows and columns or in any other desired pattern (e.g., the antennas need not be arranged in a grid pattern having rows and columns). During signal transmission operations, radio-frequency transmission line paths 50 may be used to supply signals (e.g., radio-frequency signals such as millimeter wave and/or centimeter wave signals) from transceiver circuitry 36 (FIG. 2) to phased antenna array 76 for wireless transmission. During signal reception operations, radio-frequency transmission line paths 50 may be used to supply signals received at phased antenna array 76 (e.g., from external wireless equipment or transmitted signals that have been reflected off of external objects) to transceiver circuitry 36 (FIG. 3).

The use of multiple antennas 40 in phased antenna array 76 allows beam steering arrangements to be implemented by controlling the relative phases and magnitudes (amplitudes) of the radio-frequency signals conveyed by the antennas. In the example of FIG. 7, antennas 40 each have a corresponding radio-frequency phase and magnitude controller 70 (e.g., a first phase and magnitude controller 70-1 interposed on radio-frequency transmission line path 50-1 may control phase and magnitude for radio-frequency signals handled by antenna 40-1, a second phase and magnitude controller 70-2 interposed on radio-frequency transmission line path 50-2 may control phase and magnitude for radio-frequency signals handled by antenna 40-2, an Nth phase and magnitude controller 70-N interposed on radio-frequency transmission line path 50-N may control phase and magnitude for radio-frequency signals handled by antenna 40-N, etc.).

Phase and magnitude controllers 70 may each include circuitry for adjusting the phase of the radio-frequency signals on radio-frequency transmission line paths 50 (e.g., phase shifter circuits) and/or circuitry for adjusting the magnitude of the radio-frequency signals on radio-frequency transmission line paths 50 (e.g., power amplifier and/or low noise amplifier circuits). Phase and magnitude controllers 70 may sometimes be referred to collectively herein as beam steering circuitry (e.g., beam steering circuitry that steers the beam of radio-frequency signals transmitted and/or received by phased antenna array 76).

Phase and magnitude controllers 70 may adjust the relative phases and/or magnitudes of the transmitted signals that are provided to each of the antennas in phased antenna array 76 and may adjust the relative phases and/or magnitudes of the received signals that are received by phased antenna array 76. Phase and magnitude controllers 70 may, if desired, include phase detection circuitry for detecting the phases of the received signals that are received by phased antenna array 76. The term "beam" or "signal beam" may be used herein to collectively refer to wireless signals that are transmitted and received by phased antenna array 76 in a particular direction. The signal beam may exhibit a peak gain that is oriented in a particular pointing direction at a corresponding pointing angle (e.g., based on constructive and destructive interference from the combination of signals from each antenna in the phased antenna array). The term "transmit beam" may sometimes be used herein to refer to radio-frequency signals that are transmitted in a particular direction whereas the term "receive beam" may sometimes be used herein to refer to radio-frequency signals that are received from a particular direction.

If, for example, phase and magnitude controllers 70 are adjusted to produce a first set of phases and/or magnitudes for transmitted radio-frequency signals, the transmitted signals will form a transmit beam as shown by beam B1 of FIG. 7 that is oriented in the direction of point A. If, however, phase and magnitude controllers 70 are adjusted to produce a second set of phases and/or magnitudes for the transmitted signals, the transmitted signals will form a transmit beam as shown by beam B2 that is oriented in the direction of point B. Similarly, if phase and magnitude controllers 70 are adjusted to produce the first set of phases and/or magnitudes, radio-frequency signals (e.g., radio-frequency signals in a receive beam) may be received from the direction of point A, as shown by beam B1. If phase and magnitude controllers 70 are adjusted to produce the second set of phases and/or magnitudes, radio-frequency signals may be received from the direction of point B, as shown by beam B2.

Each phase and magnitude controller 70 may be controlled to produce a desired phase and/or magnitude based on a corresponding control signal S received from control circuitry 38 (e.g., the phase and/or magnitude provided by phase and magnitude controller 70-1 may be controlled using control signal S1, the phase and/or magnitude provided by phase and magnitude controller 70-2 may be controlled using control signal S2, etc.). If desired, the control circuitry may actively adjust control signals S in real time to steer the transmit or receive beam in different desired directions over time. Phase and magnitude controllers 70 may provide information identifying the phase of received signals to control circuitry 38 if desired.

When performing wireless communications using radio-frequency signals at millimeter and centimeter wave frequencies, the radio-frequency signals are conveyed over a line of sight path between phased antenna array 76 and external communications equipment. If the external object is located at point A of FIG. 7, phase and magnitude controllers 70 may be adjusted to steer the signal beam towards point A (e.g., to steer the pointing direction of the signal beam towards point A). Phased antenna array 76 may transmit and receive radio-frequency signals in the direction of point A. Similarly, if the external communications equipment is located at point B, phase and magnitude controllers 70 may be adjusted to steer the signal beam towards point B (e.g., to steer the pointing direction of the signal beam towards point B). Phased antenna array 76 may transmit and receive radio-frequency signals in the direction of point B. In the example of FIG. 7, beam steering is shown as being performed over a single degree of freedom for the sake of simplicity (e.g., towards the left and right on the page of FIG. 7). However, in practice, the beam may be steered over two or more degrees of freedom (e.g., in three dimensions, into and out of the page and to the left and right on the page of FIG. 7). Phased antenna array 76 may have a corresponding field of view over which beam steering can be performed (e.g., in a hemisphere or a segment of a hemisphere over the phased antenna array). If desired, device 10 may include multiple phased antenna arrays that each face a different direction to provide coverage from multiple sides of the device.

In one suitable arrangement that is described herein as an example, the antennas 40 in device 10 include a triplet of ultra-wideband antennas and first and second phased antenna arrays for conveying radio-frequency signals at centimeter and millimeter wave frequencies. In some scenarios, the triplet of ultra-wideband antennas and the phased antenna arrays are formed on separate respective substrates or modules. However, space is often at a premium in devices such as device 10. Forming the triplet of ultra-wideband antennas and the phased antenna arrays on separate respective substrates or modules may occupy an excessive amount of space in device 10, can undesirably increase manufacturing cost and complexity for device 10, and can introduce mechanical non-uniformities in device 10 over time.

Figure 8:
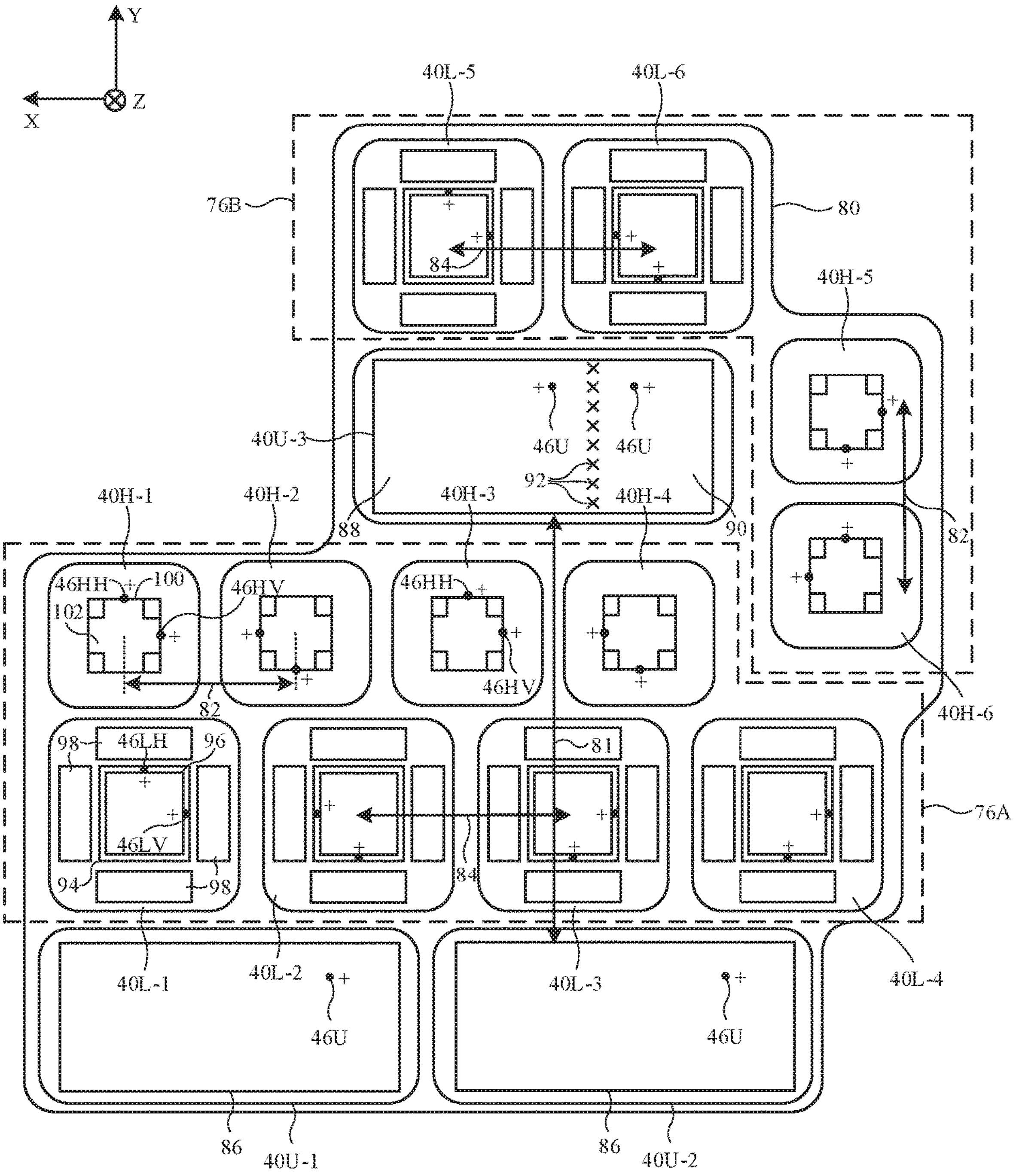
FIG. 8 is a bottom view of an illustrative antenna module having ultra-wideband antennas and phased antenna arrays in accordance with some embodiments.

In order to mitigate these issues, the triplet of ultra-wideband antennas and the first and second phased antenna arrays may both be formed as part of the same integrated antenna module. FIG. 8 is a bottom view showing how the triplet of ultra-wideband antennas and the first and second phased antenna arrays may both be formed on the same antenna module.

As shown in FIG. 8, device 10 may include an integrated antenna module such as antenna module 78. Antenna module 78 may include a dielectric substrate such as dielectric substrate 80. Dielectric substrate 80 may, for example, be a stacked dielectric substrate having two or more vertically-stacked dielectric layers.

Antenna module 78 may include a triplet of ultra-wideband antennas 40U such as ultra-wideband antennas 40U-1, 40U-2, and 40U-3. Ultra-wideband antennas 40U-1, 40U-2, and 40U-3 may convey radio-frequency signals in one or more ultra-wideband frequency bands. Each ultra-wideband antenna 40U may have a corresponding antenna resonating element. The antenna resonating element may overlap an antenna ground formed from ground traces in dielectric substrate 80.

For example, as shown in FIG. 8, ultra-wideband antennas 40U-1 and 40U-2 may each have an antenna resonating element 86 formed from a patch of conductive traces on dielectric substrate 80. Antenna resonating element 86 may therefore be a patch antenna resonating element (sometimes referred to herein as a patch element, patch resonating element, patch radiating element, or patch radiator). Corresponding positive antenna feed terminals 46 such as positive antenna feed terminals 46U may be coupled to each antenna resonating element 86 for feeding ultra-wideband antennas 40U-1 and 40U-2. The length of antenna resonating element 86 (e.g., parallel to the X-axis of FIG. 8) may be selected to configure ultra-wideband antennas 40U-1 and 40U-2 to radiate in a corresponding ultra-wideband frequency band (e.g., a 6.5 GHz UWB frequency band). This is merely illustrative. If desired, a return path may be coupled between antenna resonating element 86 and the ground traces to configure antenna resonating element 86 to form a planar inverted-F antenna resonating element. In general, antenna resonating element 86 may be formed using any other desired antenna resonating element structures (e.g., antenna resonating elements having any desired shape, any desired number of curved and/or straight edges, any desired feeding arrangement, etc.).

Ultra-wideband antenna 40U-3 may have an antenna resonating element that includes a first antenna resonating element arm 88 and a second antenna resonating element arm 90. Antenna resonating element arms 88 and 90 may be formed from conductive traces on dielectric substrate 80. Antenna resonating element arms 88 and 90 may each be fed by a respective positive antenna feed terminal 46U. Antenna resonating element arms 88 and 90 may be separated by a fence of conductive vias 92 that couple the conductive traces forming antenna resonating element arms 88 and 90 to the ground traces in dielectric substrate 80. The fence of conductive vias 92 may form a return path for ultra-wideband antenna 40U-3. The antenna resonating element for ultra-wideband antenna 40U-3 may therefore be a dual-band planar-inverted-F antenna resonating element (e.g., antenna resonating element arms 88 and 90 may be planar inverted-F antenna resonating element arms extending from opposing sides of conductive vias 92).

The length of antenna resonating element arm 88 (e.g., parallel to the X-axis of FIG. 8) may be selected to configure ultra-wideband antenna 40U-3 to radiate in the first ultra-wideband frequency band (e.g., the 6.5 GHz UWB frequency band). The length of antenna resonating element arm 90 (e.g., parallel to the X-axis of FIG. 8) may be selected to configure ultra-wideband antenna 40U-3 to also radiate in a second ultra-wideband frequency band (e.g., the 8.0 GHz UWB frequency band). This is merely illustrative. If desired, ultra-wideband antenna 40U-3 may be a single band antenna (e.g., similar to ultra-wideband antennas 40U-1 and 40U-2 of FIG. 8). If desired, one or both of ultra-wideband antennas 40U-1 and 40U-2 may be dual-band antennas (e.g., similar to ultra-wideband antenna 40U-3 of FIG. 8) for conveying radio-frequency signals in both the 6.5 GHz and 8.0 GHz UWB frequency bands. In general, ultra-wideband antenna 40U-3 may be formed using any other desired antenna resonating element structures (e.g., antenna resonating elements having any desired shape, any desired number of curved and/or straight edges, any desired feeding arrangement, etc.).

The triplet of ultra-wideband antennas 40U-1, 40U-2, and 40U-3 may be used to determine distance D of FIG. 4 and/or to determine the angle of arrival of incident radio-frequency signals in one or both of the 6.5 GHz and 8.0 GHz UWB frequency bands. If desired, ultra-wideband antenna 40U-1, ultra-wideband antenna 40U-2, or ultra-wideband antenna 40U-3 may be omitted (e.g., antenna module 78 may include a doublet of ultra-wideband antennas 40U).

Antenna module 78 may also include multiple phased antenna arrays 76 such as first phased antenna array 76A and second phased antenna array 76B. First phased antenna array 76A may include a first set of antennas 40H that radiate in a relatively high 5G NR FR2 frequency band (e.g., at frequencies between about 37-43 GHz). First phased antenna array 76A may include any desired number of antennas 40H. In the example of FIG. 8, first phased antenna array 76A includes four antennas 40H such as antennas 40H-1, 40H-2, 40H-3, and 40H-4. Each antenna 40H in first phased antenna array 76A may be separated from one or two adjacent antennas 40H in first phased antenna array 76A by distance 82. Distance 82 may be selected to allow the antennas 40H in first phased antenna array 76A to perform satisfactory beam forming operations (e.g., distance 82 may be approximately equal to one-half the effective wavelength of operation of antennas 40H, where the effective wavelength is equal to a free space wavelength multiplied by a constant value that is selected based on the dielectric constant of dielectric substrate 80).

First phased antenna array 76A may also include a second set of antennas 40L that radiate in a relatively low 5G NR FR2 frequency band (e.g., at frequencies between about 24-30 GHz). First phased antenna array 76A may include any desired number of antennas 40L. In the example of FIG. 8, first phased antenna array 76A includes four antennas 40L such as antennas 40L-1, 40L-2, 40L-3, and 40L-4. Each antenna 40L in first phased antenna array 76A may be separated from one or two adjacent antennas 40L in first phased antenna array 76A by distance 84. Distance 84 may be selected to allow the antennas 40L in first phased antenna array 76A to perform satisfactory beam forming operations (e.g., distance 84 may be approximately equal to one-half the effective wavelength of operation of antennas 40L).

In the example of FIG. 8, first phased antenna array 76A includes a first row of antennas 40H and a second row of antennas 40L. This is merely illustrative and, in general, the antennas 40H and 40L in first phased antenna array 76A may be arranged in any desired pattern (e.g., antennas 40H may be interleaved with antennas 40L in a single row, antennas 40H may be interleaved with antennas 40L across two rows, etc.). Collectively, antennas 40H and 40L may allow first phased antenna array 76A to convey radio-frequency signals (e.g., under a beam forming scheme) in both the relatively low 5G NR FR2 frequency band and the relatively high 5G NR FR2 frequency band.

Second phased antenna array 76B may include a third set of antennas 40H that radiate in the relatively high 5G NR FR2 frequency band (e.g., at frequencies between about 37-43 GHz). Second phased antenna array 76B may include any desired number of antennas 40H. In one suitable arrangement that is sometimes described herein as an example, second phased antenna array 76B includes fewer antennas 40H than first phased antenna array 76A (e.g., second phased antenna array 76B may include two antennas 40H such as antennas 40H-5 and 40H-6). Antennas 40H-5 and 40H-6 may be separated from each other by distance 82.

Second phased antenna array 76B may also include a fourth set of antennas 40L that radiate in the relatively low 5G NR FR2 frequency band (e.g., at frequencies between about 24-30 GHz). Second phased antenna array 76B may include any desired number of antennas 40L. In one suitable arrangement that is sometimes described herein as an example, second phased antenna array 76B includes fewer antennas 40L than first phased antenna array 76B (e.g., second phased antenna array 76B may include two antennas 40L such as antennas 40L-5 and 40L-6). Antennas 40L-5 and 40L-6 may be separated from each other by distance 84.

The antennas in second phased antenna array 76B may be located on portions (regions) of dielectric substrate 80 that are not occupied by first phased antenna array 76A and ultra-wideband antennas 40U-1, 40U-2, and 40U-3. For example, as shown in FIG. 8, antennas 40H-5 and 40H-6 may be arranged in a column and may be laterally interposed between ultra-wideband antenna 40U-3 and antenna 40H-4 and the right edge of dielectric substrate 80. At the same time, antennas 40L-5 and 40L-6 may be arranged in a row and may be laterally interposed between ultra-wideband antenna 40U-3 and the upper edge of dielectric substrate 80. This is merely illustrative and, in general, the antennas 40H and 40L in second phased antenna array 76B may be arranged in any desired pattern. Collectively, antennas 40H and 40L may allow phased antenna array 76B to convey radio-frequency signals (e.g., under a beam forming scheme) in both the relatively low 5G NR FR2 frequency band and the relatively high 5G NR FR2 frequency band.

If desired, second phased antenna array 76B may be steered independently of first phased antenna array 76A. For example, first phased antenna array 76A may convey radio-frequency signals within a first signal beam whereas second phased antenna array 76B conveys radio-frequency signals within a second signal beam. In one suitable arrangement that is described herein as an example, first phased antenna array 76A may be a primary phased antenna array for device 10 whereas second phased antenna array 76B is a secondary or diversity phased antenna array for device 10.

Control circuitry 38 (FIG. 2) may, for example, gather sensor data, wireless performance metric data, or other data indicative of the radio-frequency performance of phased antenna arrays 76A and 76B over time. Control circuitry 38 may convey radio-frequency signals in the 5G NR FR2 frequency bands using first phased antenna array 76A. When the gathered data indicates that first phased antenna array 76A is being blocked by an external object (e.g., a user's hand, a table top, or other external objects) or is otherwise exhibiting unsatisfactory radio-frequency performance (e.g., when the gathered wireless performance metric data falls outside of a predetermined range of satisfactory wireless performance metric data values), control circuitry 38 may switch first phased antenna array 76A out of use. Control circuitry 38 may subsequently switch second phased antenna array 76B into use and may use second phased antenna array 76B to convey radio-frequency signals in the 5G NR FR2 frequency bands until first phased antenna array 76A is no longer being blocked or would otherwise exhibit satisfactory radio-frequency performance. In this way, antenna module 78 may continue to convey radio-frequency signals in the 5G NR FR2 frequency bands even if external objects occasionally block part of antenna module 78 over time.

Antennas 40H and 40L in phased antenna arrays 76A and 76B may be formed using any desired antenna structures. In one suitable arrangement that is described herein as an example, antennas 40H and 40L are stacked patch antennas. For example, as shown in FIG. 8, each antenna 40H may have an antenna resonating element 100 formed from a patch of conductive traces on dielectric substrate 80 (e.g., antenna resonating element 100 may be a patch antenna resonating element and may therefore sometimes be referred to herein as patch element 100). Antenna 40H may have a parasitic element 102 formed from a patch of conductive traces that is stacked over patch element 100.

Patch element 100 may be directly fed by one or more positive antenna feed terminals 46H. For example, patch element 100 may be fed by a first positive antenna feed terminal 46HH coupled to a first edge of patch element 100 and may be fed by a second positive antenna feed terminal 46HV coupled to a second edge of patch element 100 (e.g., an edge orthogonal to the first edge). Feeding patch element 100 using multiple positive antenna feed terminals may allow antenna 40H to convey radio-frequency signals with multiple polarizations. For example, first positive antenna feed terminal 46HH may convey radio-frequency signals with a first linear (e.g., horizontal) polarization whereas second positive antenna feed terminal 46HV conveys radio-frequency signals with a second linear (e.g., vertical) polarization. Circular or elliptical polarizations may also be used if desired.

The length of patch element 100 may be selected to radiate in the relatively high 5G NR FR2 frequency band. Parasitic element 102, which is not directly connected to or fed by positive antenna feed terminals 46HV and 46HH, may have dimensions that vary slightly from the dimensions of patch element 100. This may configure parasitic element 102 to broaden the bandwidth of antenna 40H. If desired, parasitic element 102 may be a cross-shaped patch (e.g., having orthogonal arms overlapping positive antenna feed terminals 46HV and 46HH). This may configure parasitic element 102 to perform impedance matching for antenna 40H, for example. This example is merely illustrative and, in general, antennas 40H may be formed using any desired antenna structures.

Similarly, each antenna 40L may have an antenna resonating element 94 formed from a patch of conductive traces on dielectric substrate 80 (e.g., antenna resonating element 94 may be a patch antenna resonating element and may therefore sometimes be referred to herein as patch element 94). Antenna 40L may have a parasitic element 96 formed from a patch of conductive traces that is stacked over patch element 94.

Patch element 94 may be directly feed by one or more positive antenna feed terminals 46L. For example, patch element 94 may be fed by a first positive antenna feed terminal 46LH coupled to a first edge of patch element 94 and may be fed by a second positive antenna feed terminal 46LV coupled to a second edge of patch element 94 (e.g., an edge orthogonal to the first edge). Feeding patch element 94 using multiple positive antenna feed terminals may allow antenna 40L to convey radio-frequency signals with multiple polarizations. For example, first positive antenna feed terminal 46LH may convey radio-frequency signals with a first linear (e.g., horizontal) polarization whereas second positive antenna feed terminal 46LV conveys radio-frequency signals with a second linear (e.g., vertical) polarization. If desired, additional parasitic elements 98 may laterally surround patch element 94 and/or parasitic element 96 (e.g., parasitic elements 98 may be formed from conductive traces on the same dielectric layer of dielectric substrate 80 as patch element 94 and/or from conductive traces on the same dielectric layer as parasitic element 96). Parasitic elements 98 may contribute to the radiative response of antenna 40L (e.g., for broadening the bandwidth of antenna 40L) and/or may help to isolate antenna 40L from adjacent antennas and components in device 10, for example.

The length of patch element 94 may be selected to radiate in the relatively low 5G NR FR2 frequency band. Parasitic element 96, which is not directly connected to or fed by positive antenna feed terminals 46HV and 46HH, may have dimensions that vary slightly from the dimensions of patch element 94. This may configure parasitic element 96 to broaden the bandwidth of antenna 40L. Patch element 100 in antennas 40H and patch element 94 in antennas 40L may overlap ground traces in dielectric substrate 80 (e.g., the same ground traces used to form the antenna ground for ultra-wideband antennas 40U, if desired). This example is merely illustrative and, in general, antennas 40H may be formed using any desired antenna structures. If desired, fences of conductive vias extending through dielectric substrate 80 may laterally surround one or more (e.g., all) of the antennas in antenna module 78. The fences of conductive vias may, for example, help to isolate each of the antennas from each other and/or from interference from other components in device 10.

In general, ultra-wideband antenna 40U-3 may be separated from ultra-wideband antennas 40U-1 and 40U-2 by gap 81. Selecting a relatively large gap 81 may allow control circuitry 38 (FIG. 2) to resolve the angle of arrival of incoming radio-frequency signals with relatively high accuracy and/or precision, for example. In order to minimize space consumption within device 10, first phased antenna array 76A may be interleaved within the triplet of ultra-wideband antennas in antenna module 78.

For example, as shown in FIG. 8, first phased antenna array 76A may be laterally interposed on dielectric substrate 80 between ultra-wideband antenna 40U-3 and ultra-wideband antennas 40U-1 and 40U-2. At the same time, ultra-wideband antenna 40U-3 may be laterally interposed on dielectric substrate 80 between the antennas 40L in second phased antenna array 76B and first phased antenna array 76A. By taking advantage of the presence of gap 81 in the triplet of ultra-wideband antennas 40U and the required distances 82 and 84 in phased antenna arrays 76A and 76B in this way, antenna module 78 may perform both ultra-wideband communications and communications at millimeter and centimeter wave frequencies within as small a lateral footprint as possible within device 10. This may, for example, allow for as much space as possible within device 10 for forming other device components.

Antenna module 78 may be mounted at any desired location within device 10. In one suitable arrangement that is described herein as an example, antenna module 78 may be pressed against or layered adjacent to rear housing wall 12R of device 10 (FIG. 1). This may configure phased antenna arrays 76A and 76B and the triplet of ultra-wideband antennas 40U to radiate through rear housing wall 12R. In scenarios where rear housing wall 12R includes a conductive support plate, apertures in the conductive support plate may be aligned with the antennas in antenna module 78 to allow the antennas to radiate through rear housing wall 12R. In other arrangements, the antennas in antenna module 78 may radiate through display 14 and/or peripheral conductive housing structures 12W (FIG. 1).

The example of FIG. 8 is merely illustrative. The antennas in antenna module 78 may be implemented using any desired antenna structures having any desired shapes. Antenna module 78 may include more than two phased antenna arrays 76 or only one of phased antenna arrays 76A and 76B. Phased antenna arrays 76A and 76B may include any desired number of antennas that radiate in any desired frequency bands. Substrate 80 may have any desired shape.

Figure 9:
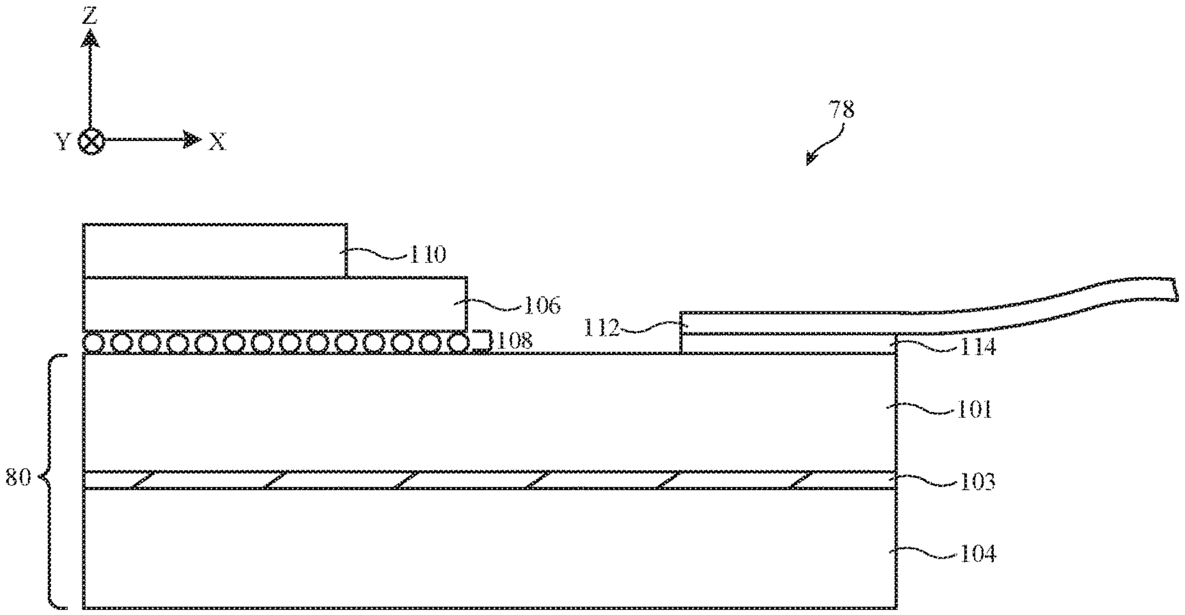
FIG. 9 is a side view of an illustrative antenna module having a radio-frequency integrated circuit mounted to routing layers using an interposer in accordance with some embodiments.

One or more electrical components for supporting the operation of phased antenna arrays 76A and 76B such as a radio-frequency integrated circuit (RFIC) may be mounted to dielectric substrate 80. FIG. 9 is a side view of antenna module 78 showing how antenna module 78 may have an RFIC mounted to dielectric substrate 80.

As shown in FIG. 9, dielectric substrate 80 may include stacked dielectric layers 104. Dielectric layers 104 may be used to form antennas 40H, 40L, and 40U (e.g., the antenna resonating elements for the antennas may be formed from conductive traces patterned onto one or more of dielectric layers 104). Dielectric layers 104 may sometimes be referred to herein as antenna layers 104. Dielectric substrate 80 may include ground traces 103 that separate antenna layers 104 from stacked dielectric layers 101. Stacked dielectric layers 101 may include ground traces and signal traces for the radio-frequency transmission line paths 50 (FIG. 3) that are used to feed the antennas 40H, 40L, and 40U in antenna module 78. Dielectric layers 101 may therefore sometimes be referred to herein as routing layers 101. Ground traces 103 may form part of the antenna ground for the antennas in antenna module 78. Openings may be formed in ground traces 103 to accommodate conductive vias that extend from signal traces in routing layers 101 to the positive antenna feed terminals in antenna layers 104.

An RFIC such as RFIC 110 may be mounted to routing layers 101. If desired, RFIC 110 may be mounted to interposer 106. Interposer 106 may be mounted to routing layers 101 using solder balls 108. Interposer 106 may be used to help offload radio-frequency signal routing from routing layers 101 onto interposer 106. This may, for example, reduce the size, cost, and complexity of manufacturing routing layers 101 and thus antenna module 78.

Figure 10:
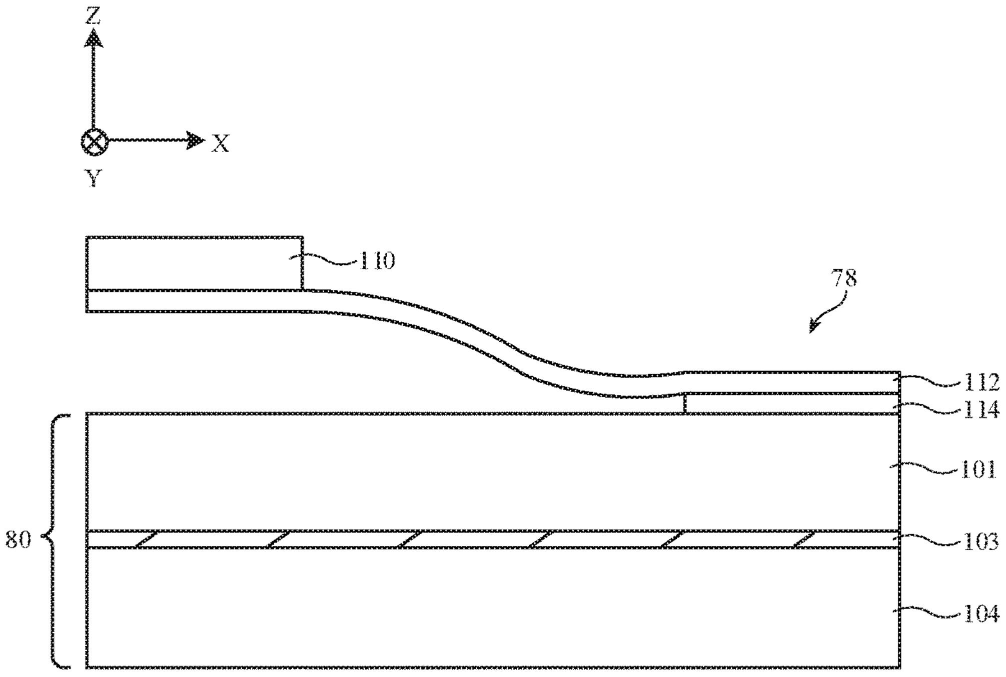
FIG. 10 is a side view of an illustrative antenna module having a radio-frequency integrated circuit mounted to routing layers using a flexible integrated circuit in accordance with some embodiments.

RFIC 110 may include radio-frequency components that support the operation of antennas 40H and 40L in antenna module 78. As an example, RFIC 110 may include at least phase and magnitude controllers 70 (FIG. 7) for phased antenna arrays 76A and 76B. The phase and magnitude controllers may be coupled to the antennas in phased antenna array 76A and 76B using conductive traces and/or conductive vias in interposer 106, routing layers 101, and antenna layers 104, as well as through solder balls 108. A radio-frequency board-to-board connector 114 may also be mounted to routing layers 101. A flexible printed circuit 112 may be coupled to routing layers 101 via board-to-board connector 114. Board-to-board connector 114 and flexible printed circuit 112 may be used to convey radio-frequency signals between the ultra-wideband antennas 40U on antenna module 78 and transceiver circuitry 36 (FIG. 3), for example. In another suitable arrangement, interposer 106 may be omitted and RFIC 110 may be coupled to routing layers 101 via flexible printed circuit 112 and board-to-board connector 114, as shown in the example of FIG. 10.

By integrating phased antenna arrays 76A and 76B and ultra-wideband antennas 40U into the same antenna module 78, space consumption may be minimized in device 10 without sacrificing radio-frequency performance. This arrangement is also more robust and less expensive to manufacture than arrangements where the phased antenna arrays and ultra-wideband antennas are formed on separate respective modules or substrates, as antenna module 78 requires less horizontal and vertical assembly tolerance and fewer board-to-board interconnects, for example.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made by those skilled in the art without departing from the scope and spirit of the described embodiments. The foregoing embodiments may be implemented individually or in any combination.

What is claimed is:

1. An electronic device comprising:

peripheral conductive housing structures;

a display mounted to the peripheral conductive housing structures;

a housing wall mounted to the peripheral conductive housing structures opposite the display;

a dielectric substrate;

a phased antenna array on the dielectric substrate and configured to radiate at a frequency greater than 10 GHz through the housing wall;

a first ultra-wideband antenna on the dielectric substrate and configured to radiate in a first ultra-wideband frequency band through the housing wall;

a second ultra-wideband antenna on the dielectric substrate and configured to radiate through the housing wall in a second ultra-wideband frequency band that is different from the first ultra-wideband frequency band, wherein the phased antenna array is laterally interposed between the first and second ultra-wideband antennas; and a third ultra-wideband antenna on the dielectric substrate, wherein the third ultra-wideband antenna is configured to radiate through the housing wall in the first ultra-wideband frequency band.

2. The electronic device of claim 1, wherein the second ultra-wideband frequency band comprises an 8.0 GHz ultra-wideband frequency band and the first ultra-wideband frequency band comprises a 6.5 GHz ultra-wideband frequency band.

3. The electronic device of claim 1, wherein the second ultra-wideband antenna comprises a dual-arm planar inverted-F antenna and the first and third ultra-wideband antennas comprise patch antennas.

4. The electronic device of claim 1, wherein the phased antenna array comprises a first set of stacked patch antennas configured to radiate at the frequency, the frequency is between 24 GHz and 30 GHz, the phased antenna array comprises a second set of stacked patch antennas configured to radiate at an additional frequency, and the additional frequency is between 37 GHz and 41 GHz.

5. The electronic device of claim 4, further comprising:

an additional phased antenna array on the dielectric substrate, wherein the additional phased antenna array comprises a third set of stacked patch antennas configured to radiate at the frequency and a fourth set of stacked patch antennas configured to radiate at the additional frequency.

6. The electronic device of claim 5, wherein the second ultra-wideband antenna is laterally interposed on the dielectric substrate between the second set of stacked patch antennas and the third set of stacked patch antennas.

7. The electronic device of claim 6, wherein there are more stacked patch antennas in the first set than the third set and there are more stacked patch antennas in the second set than the fourth set, the electronic device further comprising:

control circuitry, wherein the control circuitry is configured to perform beam steering operations using the phased antenna array and is configured to perform beam steering operations using the additional phased antenna array instead of the phased antenna array in response to detection of an external object covering the phased antenna array.

8. The electronic device of claim 1, further comprising:

a radio-frequency integrated circuit (RFIC) mounted to the dielectric substrate, wherein the RFIC comprises phase and magnitude controllers for the phased antenna array.

9. The electronic device of claim 8, wherein the dielectric substrate comprises a printed circuit board having routing layers, antenna layers, and ground traces that separate the routing layers from the antenna layers, the radiating elements of the phased antenna array and the radiating element of the ultra-wideband antenna being disposed on the antenna layers, and the RFIC being mounted to the routing layers.

10. The electronic device of claim 9, further comprising:

an interposer mounted to the routing layers using solder balls, the RFIC being mounted to the interposer.

11. The electronic device of claim 8, further comprising:

a board-to-board connector on the dielectric substrate; and a flexible printed circuit coupled to the board-to-board connector, wherein the RFIC is mounted to the flexible printed circuit.

12. The electronic device of claim 1, wherein the phased antenna array is configured to convey radio-frequency signals with a first polarization and a second polarization orthogonal to the first polarization.

13. The electronic device of claim 1, wherein the dielectric substrate comprises a flexible printed circuit.

14. The electronic device of claim 13, wherein the flexible printed circuit is layered onto the housing wall.

15. The electronic device of claim 1, wherein the dielectric substrate is pressed against the housing wall.

16. The electronic device of claim 1, wherein the first and second ultra-wideband antennas are aligned along a first axis and the phased antenna array comprises first antennas that are aligned along a second axis orthogonal to the first axis.

17. The electronic device of claim 16, wherein the first antennas aligned along the second axis are configured to radiate in a first frequency band and the phased antenna array further comprises second antennas aligned along a third axis parallel to the second axis, the second antennas being configured to radiate in a second frequency band higher than the first frequency band.

18. The electronic device of claim 17, further comprising:

an additional phased antenna array on the dielectric substrate, wherein the additional phased antenna array comprises third antennas configured to radiate in the first frequency band and aligned along a fourth axis parallel to the second axis, the second ultra-wideband antenna being interposed between the second antennas and the third antennas.

19. The electronic device of claim 17, wherein the first and third ultra-wideband antennas comprise dual band patch antennas, the second ultra-wideband antenna comprises a dual-arm planar inverted-F antenna with a first antenna resonating element arm configured to radiate in the first ultra-wideband frequency band and a second antenna resonating element arm configured to radiate in the second ultra-wideband frequency band, the first antennas aligned along the second axis comprise stacked patch antennas, the second antennas aligned along the third axis comprise stacked patch antennas, and fences of conductive vias extend through the dielectric substrate and surround at least one of the first antennas, the second antennas, or the ultra-wideband antennas.

20. The electronic device of claim 19, further comprising:

one or more processors configured to generate, based on signals received by the first and second ultra-wideband antennas, a first angle of arrival within a first plane, and configured to generate, based on signals received by the first and third ultra-wideband antennas, a second angle of arrival within a second plane orthogonal to the first plane, wherein the first and third ultra-wideband antennas are aligned along a fourth axis parallel to the second and third axes and the second and third axes are interposed between the fourth axis and the second ultra-wideband antenna.

* * * * *